(No Model.)

J. L. SPALDING.
CHECK, DRAFT, OR OTHER MONEY ORDER OR INSTRUMENT.

No. 455,127. Patented June 30, 1891.

WITNESSES:
H. Walker
C. Sedgwick

INVENTOR:
J. L. Spalding
BY Munn & Co.
ATTORNEYS

UNITED STATES PATENT OFFICE.

JOHN L. SPALDING, OF AITKIN, MINNESOTA.

CHECK, DRAFT, OR OTHER MONEY ORDER OR INSTRUMENT.

SPECIFICATION forming part of Letters Patent No. 455,127, dated June 30, 1891.

Application filed March 21, 1891. Serial No. 385,911. (No model.)

*To all whom it may concern:*

Be it known that I, JOHN L. SPALDING, of Aitkin, in the county of Aitkin and State of Minnesota, have invented a new and useful Improvement in Checks, Drafts, or other Money Orders or Instruments, of which the following is a full, clear, and exact description.

This invention, while applicable to drafts, checks, or other money orders or instruments, is mainly intended for bank-checks, and it will here be described accordingly. It has for its object the prevention, when the instrument is filled out, of altering or changing the same—as, for instance, the raising of it, or making it represent a larger sum than the one originally expressed on the face of it.

The invention relates to that description of check or money instrument in which the amount on the face of it is checked before delivery to the payee by the punching of figures on the face of the instrument indicative of the amount of the check, or at least of the largest denominations of the sum; and the invention consists in a certain arrangement of figures in table form with indicative marks or symbols attached on the face of the check to be punched, as required, to denote the value of the check, substantially as hereinafter described, and whereby great facility is afforded for checking the instrument, so that its original amount cannot be altered or raised without detection.

Reference is to be had to the accompanying drawings, forming a part of this specification, in which similar letters of reference indicate corresponding parts in all the figures.

Figs. 1, 2, 3, and 4 represent face views of bank-checks for different amounts with my invention applied.

A A represent the checks, which have printed or otherwise delineated on the face of them, preferably at the left-hand side or end thereof, a table B of, say, five columns of figures *a b c d e*, with a star or other indicating-mark *f* over each column. These columns are all numbered alike with consecutive figures 1 2 3 4 5 6 7 8 9 0, which figures may be divided by crossing or horizontal lines *g*. Each column has the same figure in the same horizontal or crossing row between the lines *g*, and each figure therein is expressive of a different denomination. Thus the figure 1 in the same horizontal row denotes, in reading it from right to left of the table, units, tens, hundreds, thousands, and tens of thousands, the increased being by the multiple ten throughout the row, which arrangement is carried out for each succeeding figure in the different columns. The stars or indicating-symbols *f* are designed to show in connection with the figures, the highest amount for which any particular check is drawn. Thus, take the example shown in Fig. 1 of the drawings, for instance, in which the check A is drawn for the sum of ten thousand, nine hundred and fifty-seven dollars, then the star or symbol over the left-hand column *e*, which indicates tens of thousands, is punched, also the number 1 in said column, and the figure 0 in the column *d*, which indicates thousands, to show that the first figure in the amount is ten thousand; then the figure 9 in the column *c*, which is expressive of hundreds, to show that the next figure in the amount is nine hundred; then the figure 5 in the column *b*, which expresses tens, to show that the next figure in the amount is fifty, and then the number 7 in the column *a*, which is a column of units, to show that the final figure in the amount is seven.

The figures in the columns are only supposed to apply to dollars in the amount, as shown by the dollar sign $ at the sides of the table opposite each horizontal row of figures, any lesser fractional sums or cents in the amount of a check not being regarded. The first column *a* in the table represents units, the second column *b* tens, the third column *c* hundreds, the fourth column *d* thousands, and the fifth column *e* tens of thousands. The table of columns of figures, however, may be extended or diminished, as required, and instead of being progressive from right to left may be otherwise arranged—as, for instance, from left to right—and the stars or indicating-symbols *f*, instead of being over the columns may be at the bottom of them. The other checks shown in the drawings for different amounts have their stars or indicating-symbols and figures in the columns of the tables B punched to similarly indicate the sum or sums in dollars expressed on the face of the check. Thus, the lower check in figure 4, which is only for five dollars, has its star or indicating-symbol over its first or unit column $a$ punched, and the number 5 in said column also punched, and so on for the other checks, (illustrated in Figs. 2 and 3,) only the places of punching being varied to correspond with the respective amounts on the faces of the checks.

The arrangement of the table B of columns of figures being at the one end or to the one side of the check, the operation is greatly facilitated.

One star or indicating-symbol $f$ only must be punched on any one check, as it shows in which column the highest sum in the amount of the check is to be found. If more than one star or symbol $f$ is punched, or more than one figure in the same column is punched, then the check would not be receivable, as the table would fail to show the amount for which the check was originally drawn.

Having thus described my invention, I claim as new and desire to secure by Letters Patent—

A blank check, draft, money order, or instrument made, substantially as herein shown and described, with a table of denominationally-progressive columns of figures arranged side by side, the figures being consecutive and the same in each column, but expressive of different denominations in the different columns, and each column having an indicating mark or symbol, as and for the purposes set forth.

JOHN L. SPALDING.

Witnesses:
WM. R. TUCKER,
SAML. S. LUTHER.